US009781189B2

(12) United States Patent
Verzano (10) Patent No.: US 9,781,189 B2
(45) Date of Patent: Oct. 3, 2017

(54) MANAGED DEVICE-TO-DEVICE COMMUNICATION IN BUSINESS COMPUTING SYSTEMS

(71) Applicant: Nemrude Verzano, St. Leon-Rot (DE)

(72) Inventor: Nemrude Verzano, St. Leon-Rot (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 14/338,100

(22) Filed: Jul. 22, 2014

(65) Prior Publication Data
US 2016/0028780 A1    Jan. 28, 2016

(51) Int. Cl.
| | |
|---|---|
| G06F 15/16 | (2006.01) |
| H04L 29/08 | (2006.01) |
| H04W 4/00 | (2009.01) |
| H04L 29/06 | (2006.01) |

(52) U.S. Cl.
CPC .............. *H04L 67/02* (2013.01); *H04L 69/18* (2013.01); *H04W 4/005* (2013.01)

(58) Field of Classification Search
CPC ......... H04L 67/02; H04L 69/18; H04W 4/005
USPC ................................................ 709/204–246
See application file for complete search history.

(56) References Cited

U.S. PATENT DOCUMENTS

| | | | | |
|---|---|---|---|---|
| 9,210,534 | B1 * | 12/2015 | Matthieu ............... | H04W 4/005 |
| 2002/0026533 | A1 * | 2/2002 | Dutta ..................... | H04L 69/08 |
| | | | | 719/313 |
| 2003/0101283 | A1 * | 5/2003 | Lewis ................. | H04L 12/2856 |
| | | | | 709/246 |
| 2007/0249345 | A1 * | 10/2007 | Wada ..................... | H04L 67/02 |
| | | | | 455/435.1 |
| 2008/0141276 | A1 * | 6/2008 | Borgendale ............. | G06F 9/546 |
| | | | | 719/313 |
| 2010/0217982 | A1 * | 8/2010 | Brown ................ | H04L 63/0807 |
| | | | | 713/168 |
| 2013/0170431 | A1 * | 7/2013 | Mann .................... | H04M 15/66 |
| | | | | 370/328 |
| 2014/0286354 | A1 * | 9/2014 | Van De Poel .......... | G06F 9/542 |
| | | | | 370/463 |

* cited by examiner

*Primary Examiner* — David Lazaro
*Assistant Examiner* — Berhanu Shitayewoldetsad
(74) *Attorney, Agent, or Firm* — Fountainhead Law Group P.C.

(57) ABSTRACT

Systems and methods for managed device-to-device communication in business computing systems are disclosed. An event stream processor is extended with a communication adapter to handle messages from devices using disparate communication protocols (e.g., versions of MQTT). The messages from the devices can be received through a gateway that converts the disparate communication protocols into a common communication protocol (e.g., WebSocket). Specific communication protocols associated with each device, as well as publisher-subscriber relationships among the devices, are established and maintained in communication adapter of the ESP.

20 Claims, 8 Drawing Sheets

MANAGED DEVICE-TO-DEVICE COMMUNICATION IN BUSINESS COMPUTING SYSTEMS

BACKGROUND

The present invention relates to electronic communication networks, and in particular, to communication among devices and business computing systems that use disparate communication and connectivity protocols. Unless otherwise indicated herein, the approaches described in this section are not prior art to the claims in this application and are not admitted to be prior art by inclusion in this section.

Many consumer and industrial computing devices are implemented using complex and relatively expensive computer processors. Even more consumer and industrial devices are implemented using less complex and relatively inexpensive microcontrollers. Such devices range in complexity from high-performance computer systems to simple temperature sensors. For example, smart phones, tablet computers, smart refrigerators, smart houses, automobiles, and the like all include computer processors, while devices such as temperature sensors, humidity sensors, light sensors, and the like typically utilize microcontrollers configured to perform specific activities.

In all such devices, many manufacturers have taken advantage of the various degrees of processing power to gather various forms of real-time, near real-time, and time elapsed data. To retrieve the data from the devices requires various types of connectivity. Accordingly, each device may have one or more types of network capability or interfaces for receiving commands or sending data. In general, such interactivity between devices is commonly referred to as the Internet of things (IoT) and describes a rich environment in which data can be automatically captured and processed for various types of control and analysis. For the full functionality of IoT to be realized requires a systematic implementation of machine-to-machine (M2M) or device-to-device (D2D) communication, such as a common machine-to-machine connectivity protocol. Telemetry transport protocols, such as MQ telemetry transport (MQTT), are examples of such connectivity protocols.

MQTT is a publish-subscribe based "light weight" messaging protocol for use on top of the TCP/IP protocol. It was designed for connections with remote locations where a "small code footprint" is required and/or network bandwidth is limited. The design principles of MQTT are to minimize network bandwidth and device resource requirements whilst also attempting to ensure reliability and some degree of assurance of delivery. These principles also turn out to make the protocol ideal of the emerging (M2M) or IoT world of connected devices, and for mobile applications where bandwidth and battery power are at a premium. However, despite efforts to standardize MQTT, there are still many disparate implementations of the protocol that prevent devices from different manufacturers from communicating with one another.

Each device may use a proprietary version of MQTT or another communication protocol altogether. The specific communication protocol used by specific device is usually determined by the manufacturer of the device. As such, to communicate with each device requires prior knowledge of the specific communication protocol used by the device. While this is relatively simple matter for the manufacturers or implementers of the specific devices, communicating among devices from various manufacturers has limited the ability of each device to communicate with one another.

SUMMARY

Embodiments of the present invention include systems and methods for managing device-to-device connectivity in and through business computing systems. In one embodiment, the present invention includes a method that includes instantiating an event stream processor comprising a communication adapter, receiving, in the event stream processor through the communication adapter, a plurality of registration requests for device-to-device communication from a plurality of devices. Each registration request can include a unique identifier and an indication of at least one communication protocol in a plurality of communication protocols. Such methods can also include generating a plurality of registration records in the event stream processor corresponding to the plurality of registration requests in a registration table.

In one embodiment, the method can also include receiving, in the event stream processor through the communication adapter, a subscription request from a first device in the plurality of devices to subscribe to a second device in the plurality of devices, wherein the subscription request comprises a first identifier associated with the first device and a second identifier associated with the second device, and associating, in the event stream processor, the first identifier with the second identifier and an indication of a first communication protocol in the plurality of communication protocols based on a registration record in the plurality of registration records corresponding to the first device.

In one embodiment, associating includes creating a subscription definition in the event stream processor comprising the first identifier, the second identifier, and the indication of the first communication protocol.

In one embodiment, the method also includes receiving, in the event stream processor through the communication adapter, a publication notification comprising data published by the second device, generating a publication message comprising the data and in accordance with the first communication protocol, and sending the publication message to the first device through the adapter.

In one embodiment, the plurality of registration requests are received from the plurality of devices through a remote gateway configured to convert the plurality of communication protocols into a common communication protocol, and the communication adapter is configured to process the plurality of registration requests in the common communication protocol.

In one embodiment, the common communication protocol comprises a WebSocket communication protocol.

In one embodiment, the plurality of communication protocols comprises a plurality of versions of MQTT communication protocol.

Another embodiment of the present disclosure includes a non-volatile computer readable medium that includes instructions that when executed by a computer processor cause the computer processor to be configure for instantiating an event stream processor comprising a communication adapter, receiving, in the event stream processor through the communication adapter, a plurality of registration requests for device-to-device communication from a plurality of devices, wherein each registration request comprises a unique identifier and an indication of at least one communication protocol in a plurality of communication protocols, and generating a plurality of registration records in the event stream processor corresponding to the plurality of registration requests in a registration table.

Yet another embodiment of the present disclosure includes a computer system comprising a processor and a memory. The memory can include instructions that when executed by the processor cause the processor to be configured to instantiate an event stream processor comprising a communication adapter, receive, in the event stream processor through the communication adapter, a plurality of registration requests for device-to-device communication from a plurality of devices, wherein each registration request comprises a unique identifier and an indication of at least one communication protocol in a plurality of communication protocols, and generate a plurality of registration records in the event stream processor corresponding to the plurality of registration requests in a registration table.

The following detailed description and accompanying drawings provide a better understanding of the nature and advantages of the present invention.

DETAILED DESCRIPTION

Described herein are techniques for systems and methods for managed device-to-device communication in business computing systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for enabling communication among various electronic devices that use different communication media and protocols within and through a business computing system. One embodiment includes a communication adapter implemented in an event stream processor (ESP) in a business computing system. In such embodiments, the adapter can process the message. For example, the adapter can translate messages received in one communication protocol to another communication protocol so that information can be shared among various devices. In one embodiment, the adapter can be configured to manage the communication between the various types of communication protocols based on communication models that describe the interactions between specific devices. For example, such communication models can be used to broker or manage publish-subscribe type interactions, as well as translate between the disparate implementations or versions of MQTT or other communication protocols. Accordingly, the complexity of setting up the interactions between devices can be greatly reduced using various embodiments of the present disclosure.

Some embodiments use the MAC address of the devices as unique identifiers. Based on the MAC address, the adapter in the ESP can reference a communication model to manage interactions, such as subscriptions and publications, among any registered devices. Additionally, the adapter can interact with other processes in the event stream processor to access functionality within the business computing environment. For example, the adapter can include functionality for storing information received from various devices in a database and/or invoke other business functions, such as functionality provided by enterprise resource planning (ERP) or customer relationship management (CRM) applications, as needed.

Figure 1:
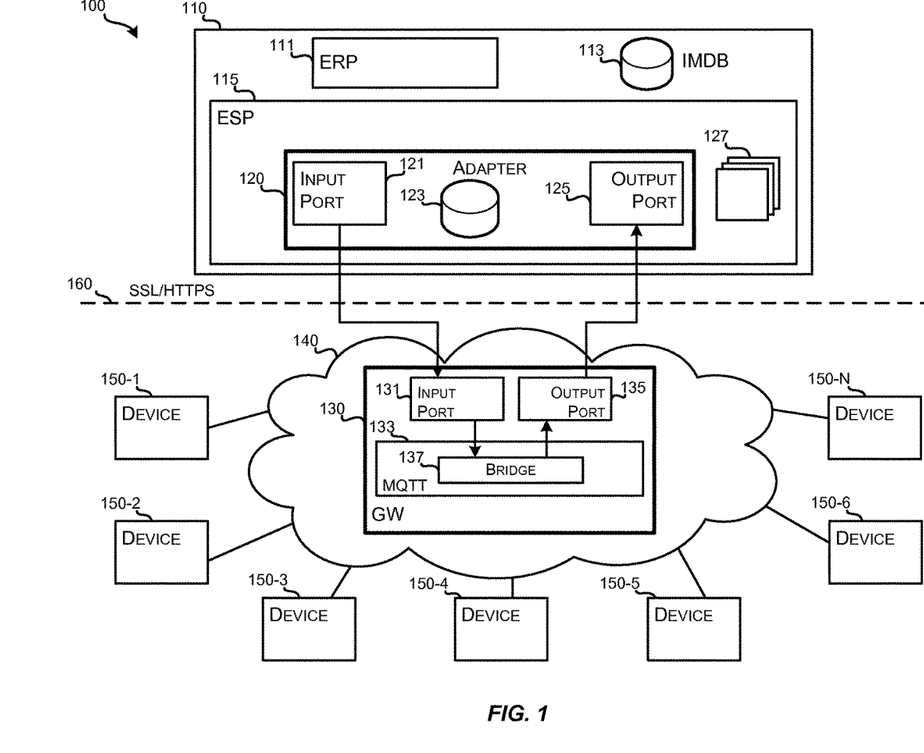
FIG. 1 is a schematic diagram of a system for device-to-device communication, according to one embodiment of the present disclosure.

FIG. 1 is a schematic diagram of a system 100 that includes an infrastructure for facilitating communication among various devices 150 that use different communication protocols, according to embodiments of the present disclosure. For example, each of the devices 150 can be a microcontroller controlled device, such as a sensor or home appliance. As shown, each device 150 can include functionality for establishing a connection over one or more networks 140 (e.g., the Internet) to a gateway 130. In various embodiments, the devices 150 can connect to a gateway 130 using one or more variations of a standardized or proprietary MQTT connection.

In such embodiments, the gateway 130 can include an MQTT module 133 for establishing the communication session between the gateway 130 and the devices 150.

Accordingly, the MQTT module 133 can include functionality for communicating using multiple variations of MQTT or other communication protocols. In one embodiment, the MQTT module 133 can include a bridge 137 for translating MQTT communication protocol messages to WebSocket protocol messages. In such embodiments, the gateway 130 can include a WebSocket output port 135 and WebSocket input port 131 for communicating via a WebSocket connection with business computing system 110.

WebSocket is a protocol that provides full-duplex communications channels over a single transmission control protocol (TCP) connection. WebSocket is designed to be implemented in web browsers and web servers, but it can be used by any client or server application. The WebSocket protocol allows for more complex interactivity between a client and a server computer. Such interactivity is made possible by providing a standardized way for the server to push content to the client without being queried by the client, and allowing for messages to be passed back and forth while keeping the connection open. In this way a two-way (e.g., bi-directional) ongoing conversation can take place between a client and the server. In the context of embodiments of the present disclosure, each device 150 can mimic the role of a client in a WebSocket protocol communication session using the gateway 130.

To establish WebSocket protocol communication sessions between the gateway 130 and the target business system 110, each device 150 can be configured or programmed with a network address, such as a universal resource identifier (URI), associated with the business system 110. In some devices, the URI can be associated with the specific ESP 115 and/or the adapter 120. Accordingly, when a device 150 initiates a MQTT protocol communication session with the gateway 130, the gateway 130 can establish a corresponding WebSocket protocol session with the target business system 110, ESP 115 and/or adapter 120 indicated by the URI indicated in the original MQTT session between the device 150 and the gateway 130. In the particular example shown, the business system 110 can include an event stream processor (ESP) 115 extended with a specific adapter 120 for establishing the WebSocket connection. In one embodiment, the ESP 115 can be implemented as an instance of the SAP Sybase ESP.

As used herein, the term "event stream processing", or "ESP", refers to a set of technologies designed to assist in the construction of event-driven information systems. ESP technologies include event visualization, event databases, event-driven middleware, and event processing languages, or complex event processing (CEP). In practice, the terms ESP and CEP are often used interchangeably. ESP deals with the task of processing multiple streams of event data with the goal of identifying the particular events within those streams, employing techniques such as detection of complex patterns of many events, event correlation and abstraction, event hierarchies, and relationships between events such as causality, membership, and timing, and event-driven processes. Accordingly, ESP 115 often includes functionality that can be extended to include adapter 120 for handling large volumes of inter-device communication.

As shown, the adapter 120 can be one of many other processes 127 handled by the ESP 115. The adapter 120 can include WebSocket input port 125 and WebSocket output port 121 for handling the bidirectional communication with the gateway 130. In some embodiments, the TCP/IP communication between the gateway 130 and the adapter 120 can be enhanced with encryption protocols, such as SSL/HTTPS 160.

In various embodiments, the adapter 120 may also include a communication protocol data store 123 to store the various communication models that define the interactions between the devices 150. In embodiments, the communication models stored in the communication protocol data store 123 can also define functionality that the ESP 115 can invoke using other functionality implemented in the business system 110. For example, the business system may include an enterprise resource planning (ERP) module 111 and/or an in memory database 113. Accordingly, any interaction between the devices 150 can be recorded in the in memory database 113 and/or analyzed by the analytical functionality of the ERP 111 or other business application.

Figure 2:
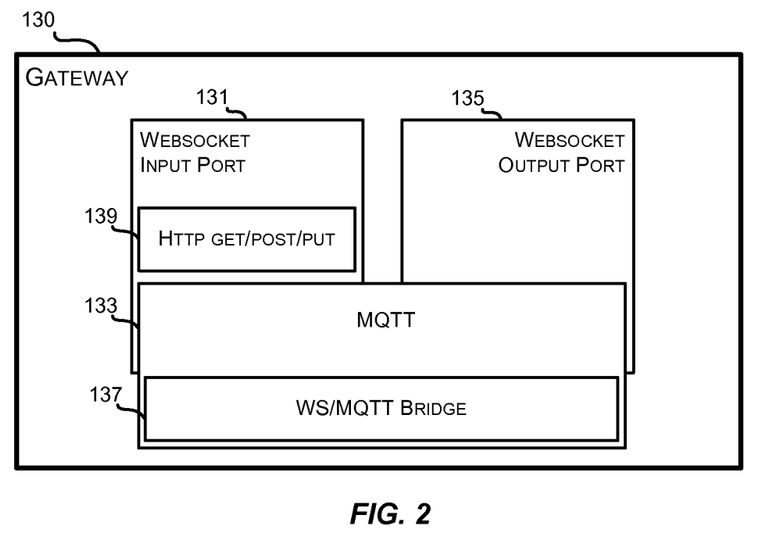
FIG. 2 is a schematic diagram of a gateway for device-to-device communication, according to one embodiment of the present disclosure.

FIG. 2 depicts a detailed view of the layers of the gateway 130, in accordance with embodiments of the present disclosure. As shown, the gateway 130 can include a WebSocket/MQTT bridge 137 situated on the MQTT layer 133. Using the translation functionality of the WebSocket/MQTT bridge 137, the MQTT layer can communicate with the adapter 120 in the ESP 115 using the input and output WebSocket ports 131 and 135. In one embodiment, the standardized HTTP layer 139 can be used in order to connect devices like microcontrollers which cannot utilize the proprietary protocol MQTT or even WebSocket but HTTP get/post/put commands. Such devices can just provide data with a get/post/put command but cannot subscribe to published data of other devices. Received HTTP data from devices 150 is being sent to ESP 115.

Figure 3:
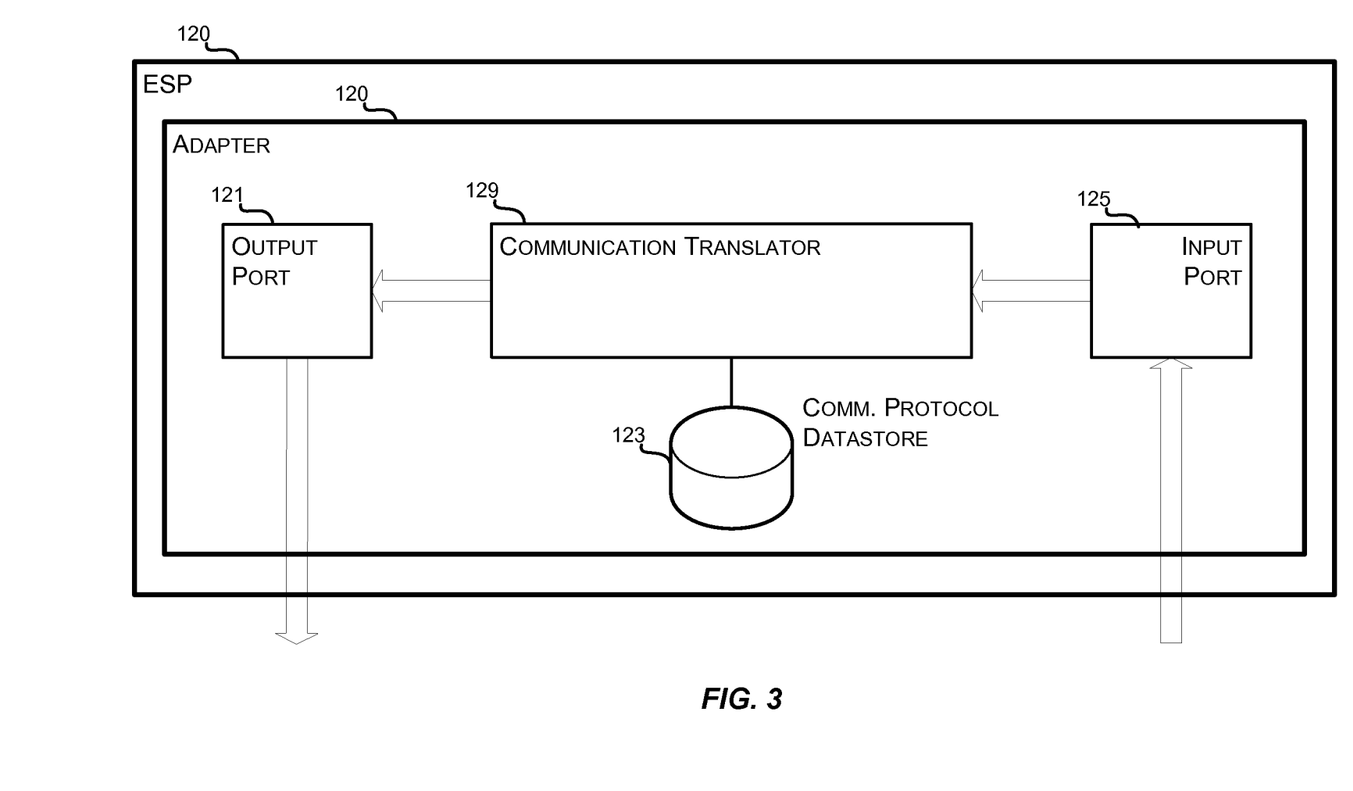
FIG. 3 is a schematic diagram of an event stream processor with an adapter for device-to-device communication, according to one embodiment of the present disclosure.

FIG. 3 depicts a detailed view of the components of the adapter 120, according to various embodiments of the present disclosure. As shown, the adapter 120 includes input and output ports 120 and 125 corresponding to the WebSocket import and output ports 131 and 135 in the gateway 130. Accordingly, the input port 125 can include functionality for communicating with WebSocket input port 131, while the output port 121 can include functionality for communicating with the WebSocket output port 135. The WebSocket communication session between the corresponding ports in the adapter 120 and the gateway 130 can facilitate the communication among one or more of the devices 150. Because each of the devices 150 may include specific communication or messaging protocols, the adapter 120 includes a communication translator 129 which can access the communication protocol data store 123 to determine the necessary protocols for facilitating interaction between the devices.

In one embodiment, the communication protocol data store 123 can include multiple communication models that define interactions between the devices 150. For example, the communication models stored in the communication protocol data store 123 can include identifiers of specific devices 150 that can publish information over the adapter 120. Similarly, the communication models stored in the communication protocol data store 123 can define specific subscriptions associated with a particular device 150. Accordingly, one device 150 can register its identifier in a communication model in the communication protocol data store 123 to indicate a subscription to a publishing device 150. Accordingly, whenever the publishing device 150 publishes information to the adapter 120, the communication translator 129 can process and forward that information to the subscribing device 150 according to the communication model. Registration of the devices 150 as publishers and subscribers are discussed in more detail in reference to FIGS. 4A through 4C.

Device Handshake/Registration

Figure 4A:
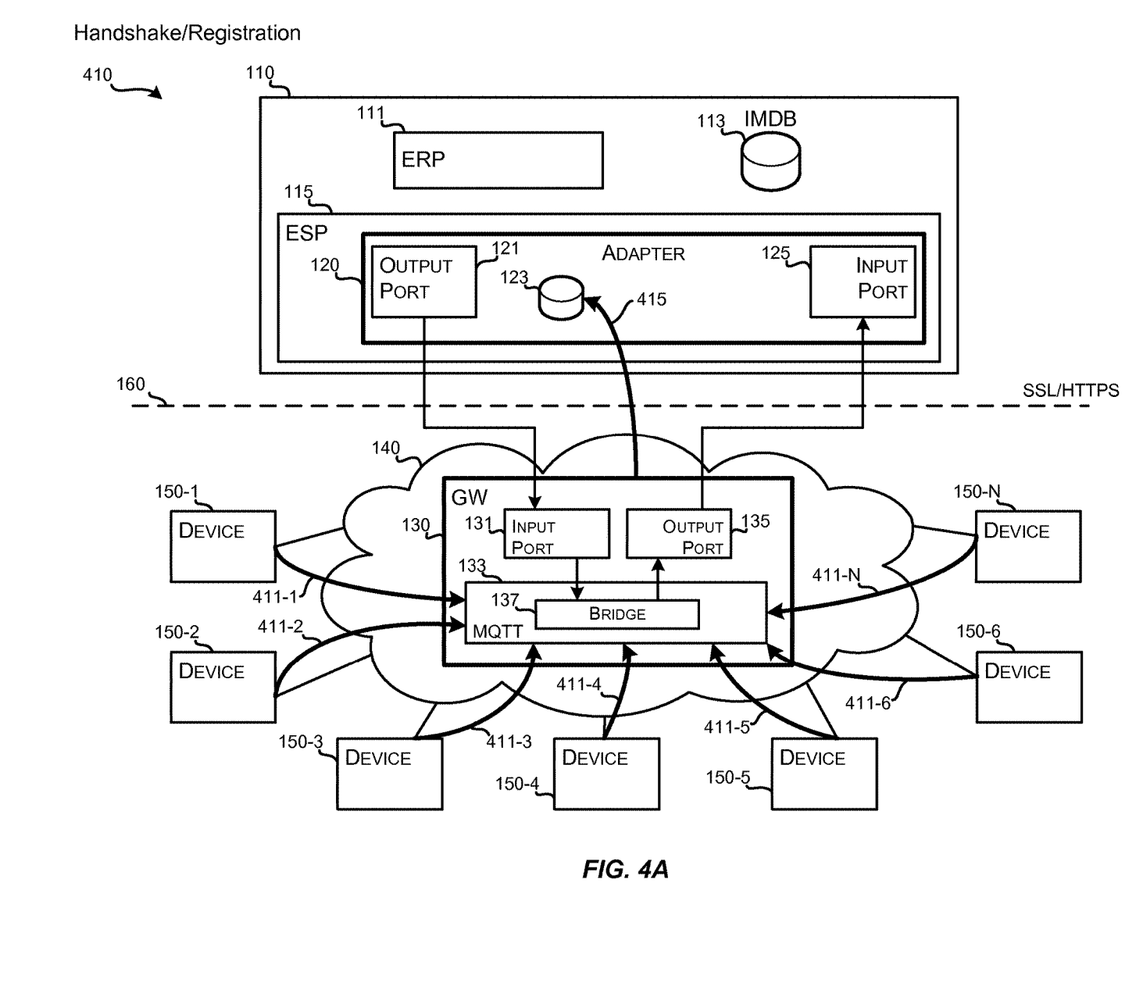
FIG. 4A illustrates a data flow for registering devices in a system for device-to-device communication, according to one embodiment of the present disclosure.

Before a particular device 150 can communicate with the other devices 150, it must first identify and register itself with the adapter 120. FIG. 4A illustrates the data flow 410 for registering device 150 with the adapter 120 and the ESP 115, in accordance with embodiments of the present disclosure. In one embodiment, registration a device 150 can include sending a corresponding registration request 411 to the gateway 130. Such registration requests 411 are commonly referred to as a handshake message and can be used to notify the adapter 120 of the presence and/or characteristics of a particular device 150.

Each registration request 411 can include various device specific information such as a unique identifier, and indication of a particular communication protocol, a device type, device name, a device role, a timestamp, etc. In some embodiments, the registration requests 411 may also include indications regarding the role of the particular device 150 as a publisher. For example, device 150-2 may register itself as a publisher of temperature information in a particular physical location that publishes every 30 seconds using registration request 411-2. In response to registration requests 411, the gateway 130 can send the registration and/or publication information 415 to the adapter 120 to be stored in one or more communication models in the communication protocol data store 123. In one embodiment, the adapter 120 can store and maintain a registration table that includes a listing of all the available devices 150, the corresponding communication protocols or messaging syntaxes, and/or the information that they are configured to publish in the communication protocol data store 123.

Subscription

Figure 4B:
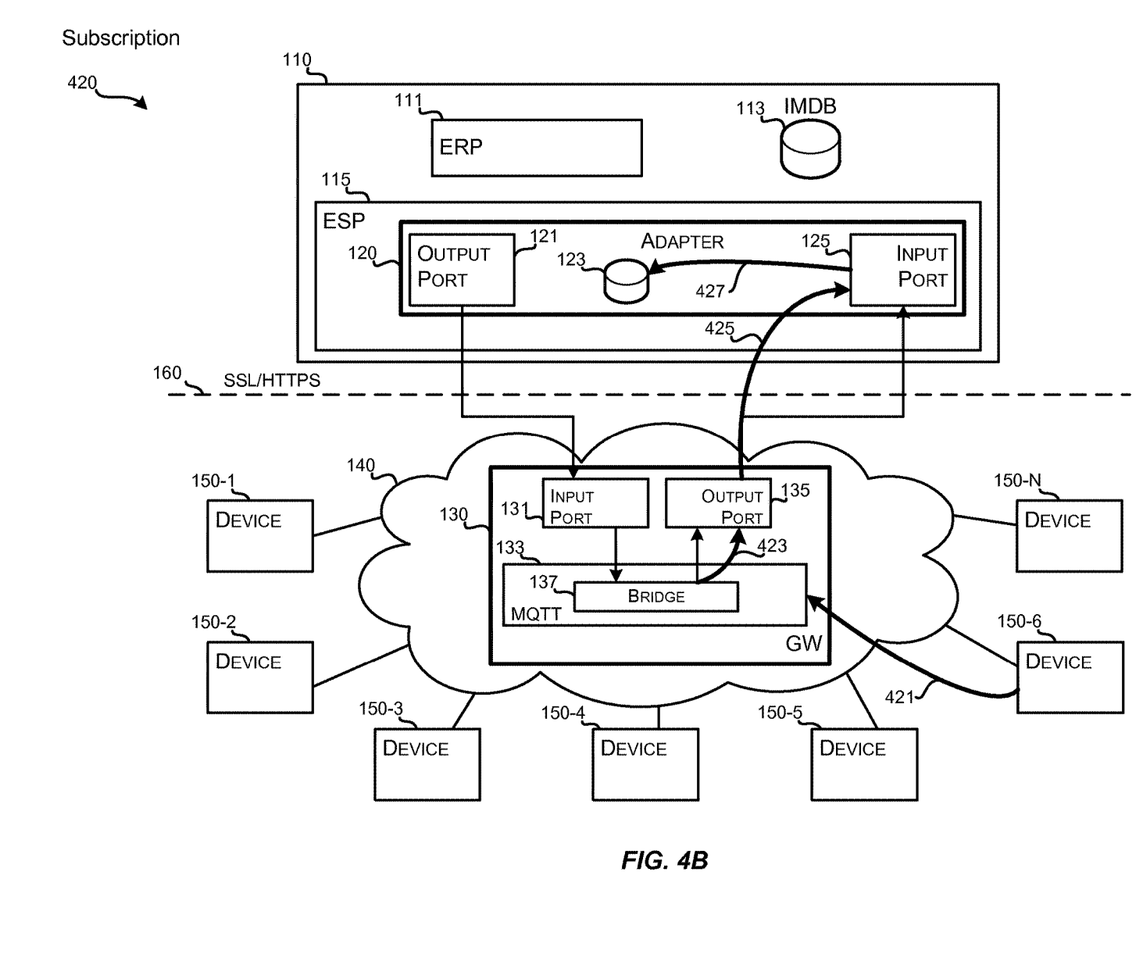
FIG. 4B illustrates a data flow for subscribing to devices in a system for device-to-device communication, according to one embodiment of the present disclosure.

FIG. 4B illustrates an illustrative data flow 420 for subscribing a particular device 150-6 to information published by one or more other devices 150. As shown, device 150-6 can send a subscription request message 421 to the gateway 130 to subscribe to information published by another device 150 (e.g., a target publishing device). Within the gateway 130, the subscription request message 421 can be translated by the bridge 137 from the native MQTT protocol to the WebSocket protocol message 423. The output port 135 can then forward the WebSocket message as an SSL/HTTPS encrypted WebSocket message 425 to the output port 121 in the adapter 120. The adapter 120 can then record the details 427 in the communication protocol data store 123. The details 427 can be stored in a subscription definition associated with either the target publishing device 150 or the subscribing device 150-6. In some embodiments, the subscription definitions can be associated with unique identifiers associated with one or more devices 150.

In such embodiments, each version of the subscription request messages 421, 423, and 425 can include a unique identifier associated with the subscribing device 150-6. Additionally, each subscription request message 421, 423, and 425 can also include an identifier associated with a target publishing device 150 and other specifications that define the type of data the subscribing device 150-6 is to receive. The specifications can define the format, timeframe, and data types in which the subscribing device 150-6 should receive the information from the target publishing device 150. The specifications can be stored in the corresponding subscription definition maintained in the communication protocol data store 123.

In one example subscription definition, the subscribing device 150-6 can include a smart phone executing an application. The application in the subscribing device 150-6 can request data from one or more publishing temperature sensors (e.g. devices 150-1 and 150-2) as soon as either one of the sensors publishes temperature data. Alternatively, the specifications can define that the adapter 120 gather the published temperature data from the temperature sensors and report them every 24 hours at a particular time. In either of such embodiments, the adapter 120 can function as message broker. Accordingly, implementing the adapter 120 in the ESP 115 advantageously leverages the existing functionalities of the ESP 115 for handling large volumes of requests for data and data messages as sequential or prioritized queues of events.

In some embodiments, the adapter 120 can send a confirmation message that the requested subscription definition was successfully saved in the communication protocol data store 123. In similar embodiments, the adapter 120 can report back any potential errors with saving the subscription definition. In yet other embodiments, the adapter 120 can confirm that the target publishing device 150 is still available to fulfill the requirements of the requested subscription definition. If the target publishing device is no longer connected to the gateway 130 and/or the ESP 115, then the adapter 120 can report back to the gateway 130 or the requesting subscribing device 150-6 that the requested subscription is not available. When the adapter 120 discovers that one of the devices 150 is no longer available, it can update the communication protocol data store 123 or delete the registration for that particular device 150.

Publication

Figure 4C:
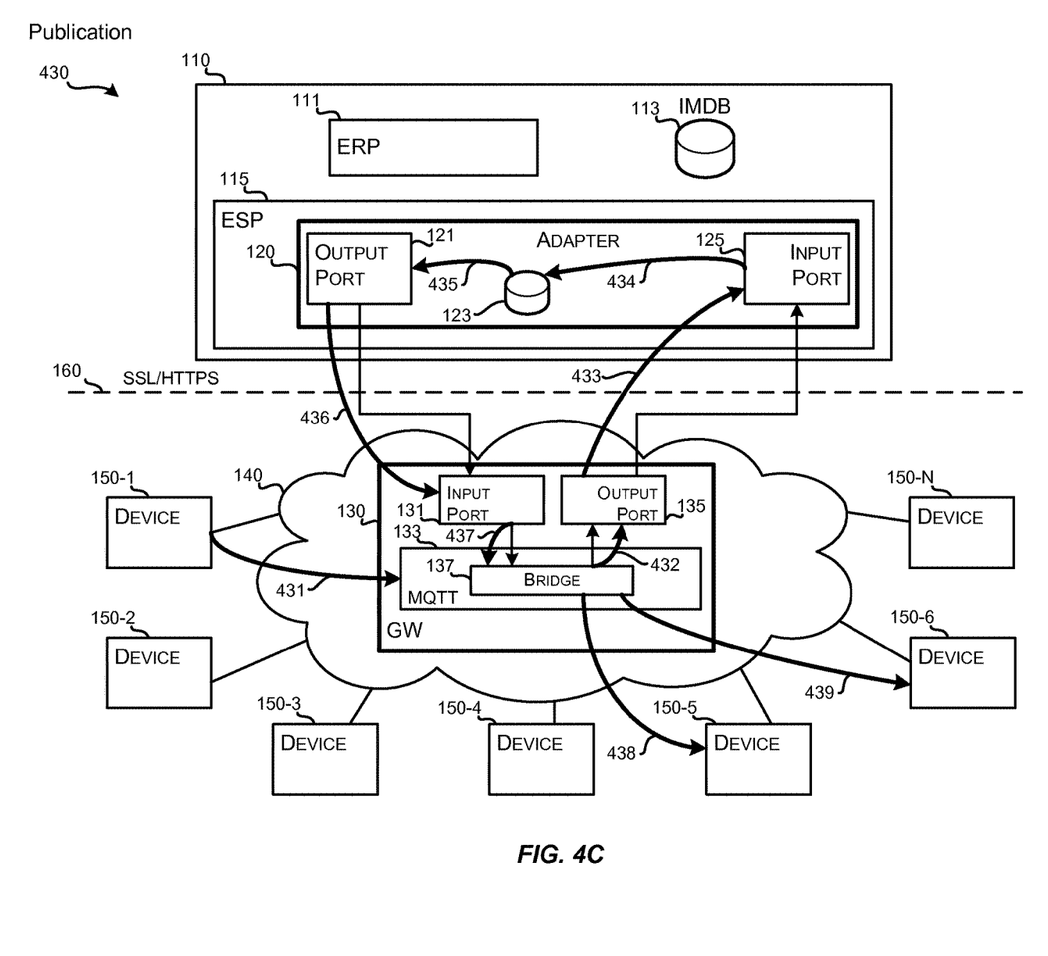
FIG. 4C illustrates a data flow for publishing data to devices in a system for device-to-device communication, according to one embodiment of the present disclosure.

FIG. 4C illustrates an example data flow 430 for a publishing device 150-1 to publish data to subscribing devices 150-5 and 150-6 according to one or more subscription definitions stored in one or more communication models in the communication protocol data store 123. In the example illustrated in FIG. 4C, the device 150-1 can publish data in a publication message 431 to the MQTT module 133. As described herein, the bridge 137 can translate the publication message 431 from the native MQTT protocol to a WebSocket protocol to generate WebSocket publication message 432 that can be routed through the output port 135. The output port 135 can generate a secure publication message 433 corresponding to the WebSocket publication message 432.

The adapter 120 can receive the secure publication message 433 via the output port 121. The adapter 120 can parse the publication message 433 to determine various information included in the publication messages 431, 432, and/or 433. Such information can include the identifier of the publishing device 150-1, the timestamp, the type of data published, the type of device, the format of the data, and the like. Using information 434 parsed from the publication messages, the adapter 120 can access the communication protocol data store 123 to determine one or more active subscribing devices 150 that might be subscribed to receive the published information. In one embodiment, determining the one or more active subscribing devices 150 can include accessing a subscription definition associated with a unique identifier (e.g., a MAC address) associated the publishing device 150-1. As described herein, the subscription definition can define one or more subscribing devices 150 that have requested the type of information published by the publishing device 150-1. In the example shown, the adapter 120 can determine a subscription definition 435 associated with publishing device 150-1 and or the published information that specifies that devices 150-5 and 150-6 should receive the published information.

In accordance with the subscription definition 435, the adapter 120 can forward the published information through the input port 125 to the gateway 130. In some embodiments, the subscription definition 435 can reference a communication models that define conversion processes for converting the published data from its native format to one or more formats required by the subscribing devices 150-5 and 150-6. In such embodiments, subscription definition can include or be associated with a communication model associated with each pair of publisher-subscriber devices 150. For example, the subscription definition can associate the subscription relationship between the publishing device 150-1 and subscribing device 150-5 with one communication model and associate the subscription relationship between the publishing device 150-1 and subscribing device 150-6 with another communication model. Accordingly, the data published by the publishing device 150-1 can be converted to the format required by the corresponding MQTT used by the subscribing devices 150-5 and 150-6.

As such, the adapter 120 can generate the secure or unsecured WebSocket publication message 436 that includes the published information as well as specific communication protocols and addressing information required by each of the subscribing devices 150. Thus, when the gateway 130 receives the publication message 436, it can forward the message through inputs port 431 as internal WebSocket publication message 437 through the bridge 137. The bridge 137 can generate and route the corresponding MQTT publication messages 438 and 439 specific to the subscribing devices 150-5 and 150-6.

Overview of the Methodology

Figure 5:
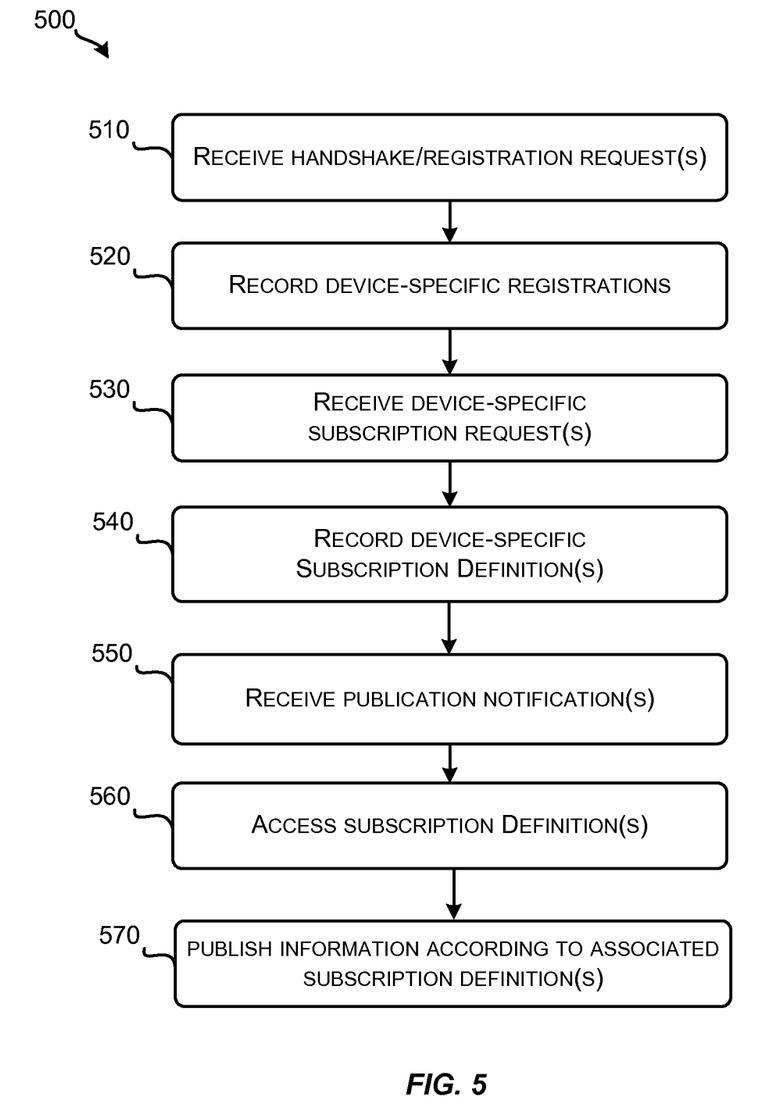
FIG. 5 is a flow chart for a method of device-to-device communication, according to one embodiment of the present disclosure.

FIG. 5 is a flowchart of a method 500 for handling the communication among devices 150 that utilize disparate communication protocols or that are otherwise incapable of establishing connections with one another due to connectivity or processing limitations. Method 100 can begin at box 510 in which an ESP 115 instantiated in a business computing environment 110 receives a handshake/registration request from one or more devices 150. For example, the ESP 115 can use the adapter 120, to receive secured (e.g., SSL/HTTP S 160) or unsecured (e.g., HTTP) registration requests from multiple devices 150 that are to communicate with one another. For example, a smart phone, a light sensor, an occupancy sensor, a smart refrigerator, and a home automation system may all initiate a handshake/registration request message to be sent to the ESP 115 through a gateway 130. Each handshake/registration request message can include information specific to the particular device 150. For example, the device specific information can include a unique identifier, a physical location, to device type identifier, a network address, a timestamp, anticipated registration timeframe, etc.

At box 520, in response to the received handshake/registration request messages, the ESP 115 can update or generate a corresponding registration record in a communication protocol data store 123 that indicates the availability of the corresponding devices 150 for publication and/or subscription services. For example, the ESP 115 can store the unique identifier, device specific address (e.g., MAC address), and an associated communication protocol. In related embodiments, the ESP 115 can provide the recorded registration records to any or all of the other registered devices 150. Accordingly, any of the registered devices 150 can have access to the identifiers of other participating devices 150, the information that they can provide, the associated communication capabilities and protocols, and any other device specific information.

At box 530, the ESP 115 can receive device specific subscription requests from one or more of the registered devices 150. In such embodiments, the device specific subscription requests can include unique identifiers associated with the subscribing device 150 and the target publishing device 150, as well as a reference to corresponding communication protocols for each of the devices 150 and a mapping between the communication protocols. In one embodiment, the reference to the corresponding communication protocols or mapping can include specification of a particular communication model stored in the communication protocol datastore 123.

At box 540, the ESP 115 can record the device specific subscriptions as subscription definitions in the communication protocol data store 123. The subscription definitions can be organized by or associated with one or more communication models that the ESP 115 can reference whenever information is published by one or more of the registered devices 150. For example, a communication model may include any and all subscription definitions associated with the particular publishing device 150 and/or its unique identifier.

At box 550, the ESP 115 can receive a publication notification from one or more publishing devices 150. In some embodiments, the publication notification can include the published data from the publishing devices 150 along with the identifier of the publishing device 150. Accordingly, at box 760, the ESP 115 can access communication models stored in the communication protocol data store 123 to determine one or more subscription definitions associated with that particular publishing device 150. At box 570, the ESP 150 can initiate the publication to one or more subscribing devices 150 as defined in communication model and/or subscription definitions. In such embodiments, publication of to the one or more subscribing devices can include generating one or more corresponding publication messages in the ESP 115 and forwarding the messages through the adapter 120 and the gateway 130 to the subscribing devices.

Figure 6:
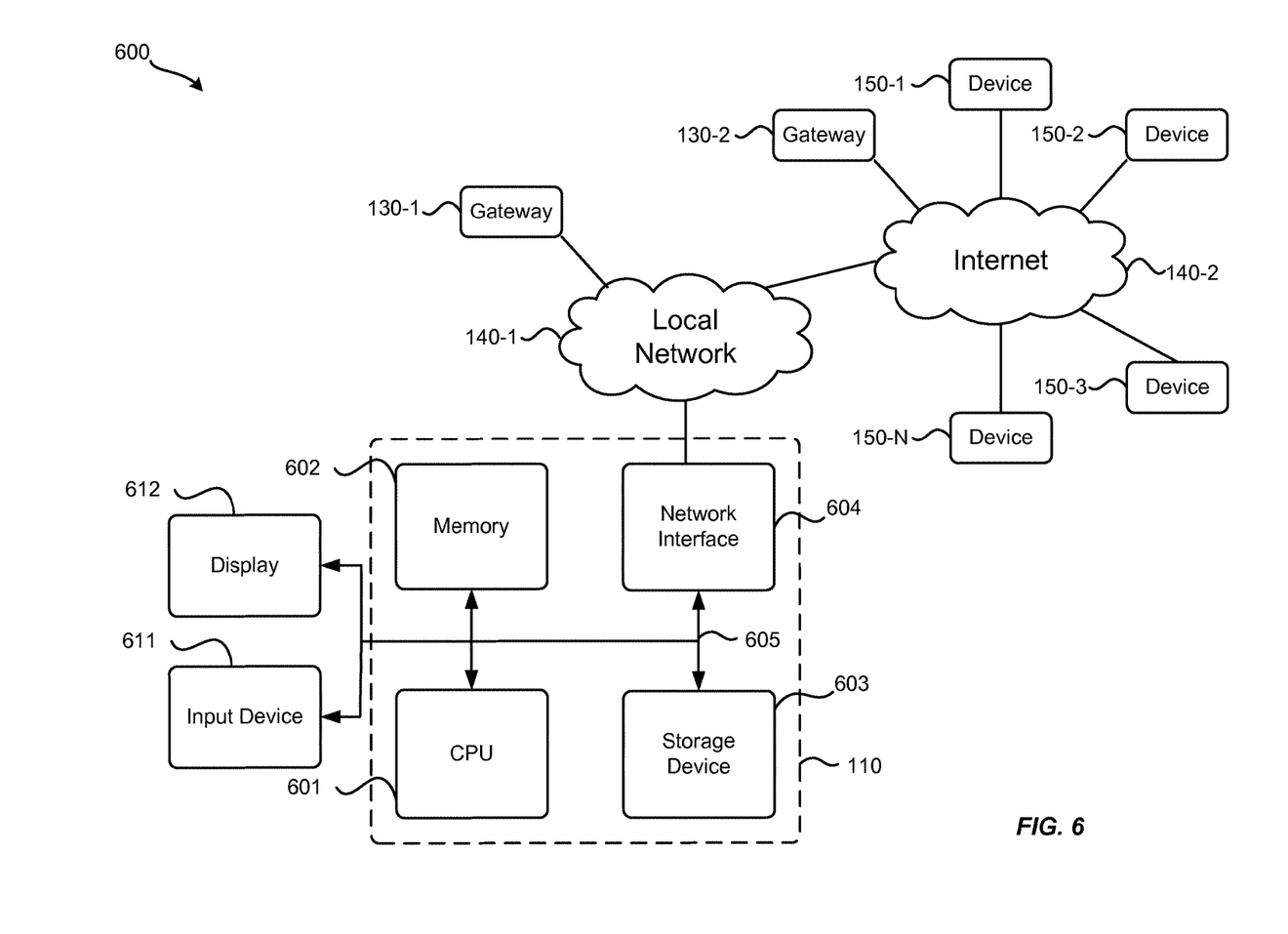
FIG. 6 is a schematic diagram of computer systems and networks that can be used to implement various embodiments of the present disclosure.

FIG. 6 illustrates an example computer system and networks that may be used to implement embodiments of the present disclosure. Computer system 110 includes a bus 605 or other communication mechanism for communicating information, and a processor 601 coupled with bus 605 for processing information. Computer system 110 also includes a memory 602 coupled to bus 605 for storing information and instructions to be executed by processor 601, including instructions for performing the techniques described above. This memory may also be used for storing temporary variables or other intermediate information during execution of instructions to be executed by processor 601. Possible implementations of this memory may be, but are not limited to, random access memory (RAM), read only memory (ROM), or both. A storage device 603 is also provided for storing information and instructions. The information instructions can be in the form of computer readable code stored on the storage device, accessible and executable by processor to implement various techniques and methods of the present disclosure. Common forms of storage devices include non-transitory, non-volatile computer readable media, for example, a hard drive, a magnetic disk, an optical disk, a CD, a DVD, a flash memory, a USB memory card, or any other medium from which a computer can read.

Computer system 110 may be coupled via the same or different information bus, such as bus 605, to a display 612, touchscreen, or liquid crystal display (LCD), for displaying information. An input device 611 such as a keyboard, touchscreen, and/or mouse is coupled to a bus for communicating information and command selections from the user to processor 601. The combination of these components allows the user to communicate with the system. In some embodiments, the display 612 and the input device 611 may be implemented in a single device, such as a touchscreen.

Computer system 110 also includes a network interface 604 coupled with bus 605. Network interface 604 may provide two-way data communication between computer system 110 and the local network 140-1. The network interface 604 may be a local area network (LAN) card to provide a data communication connection to a compatible LAN. The LAN card may include a wireless LAN (WLAN) card for communicating with a corresponding wireless network. In any such implementation, network interface 604 sends and receives electrical, electromagnetic, or optical signals that carry digital data streams representing various types of information. Accordingly, the computer system 110 can also access the Internet 140-2 and gateway 130-1 through the local network 140-1. In such configurations, computer system can also access gateway 130-2 and the devices 150 connected to the Internet 140-2.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
instantiating, by a computer system, an event stream processor comprising a communication adapter and a data store configured to store a subscription definition, a first communication model, and a second communication model, wherein the subscription definition specifies a first device as a publishing device, a second device as a subscriber of the first device, and a third device as a subscriber of the first device, wherein the first communication model specifies a first set of processes for converting messages received from the first device via a first communication protocol from a first format to a second format in order to transmit the messages to the second device via a second communication protocol, wherein the second communication model specifies a second set of processes for converting messages received from the first device via the first communication protocol from the first format to a third format in order to transmit the messages to the third device via a third communication protocol;
receiving, in the event stream processor through the communication adapter, a publication message from the first device via the first communication protocol, wherein the publication message comprises a unique identifier associated with the first device;
accessing the data store to identify the subscription definition based on the unique identifier associated with the first device;
based on the subscription definition and the first communication model, converting the publication message from the first format to the second format in order to transmit the publication message to the second device via the second communication protocol; and
based on the subscription definition and the second communication model, converting the publication message from the first format to the third format in order to transmit the publication message to the third device via the third communication protocol.

2. The method of claim 1 further comprising:
receiving, in the event stream processor through the communication adapter, a subscription request from the second device to subscribe to the first device, wherein the subscription request comprises the unique identifier associated with the first device and a unique identifier associated with the second device; and
generating, in the event stream processor, the subscription definition by associating the unique identifier associated with the second device with the unique identifier associated with the first device.

3. The method of claim 2, wherein the subscription request is a first subscription request, the method further comprising:
receiving, in the event stream processor through the communication adaptor, a second subscription request from the third device to subscribe to the first device, wherein the second subscription request comprises the unique identifier associated with the first device and a unique identifier associated with the third device; and
updating the subscription definition by associating the unique identifier associated with the third device with the unique identifier associated with the first device.

4. The method of claim 1 further comprising:
receiving, in the event stream processor through the communication adapter, a registration request from the first device, the registration request comprising the unique identifier associated with the first device and an indication of the first communication protocol; and
in response to the registration request, storing, in the data store, an association between the unique identifier associated with the first device and the indication of the first communication protocol.

5. The method of claim 1, wherein:
the publication message is received from the first device through a remote gateway configured to convert the first, second, and third communication protocols into a common communication protocol; and
the communication adapter is configured to process the publication message in the common communication protocol.

6. The method of claim 5, wherein the common communication protocol comprises a WebSocket communication protocol.

7. The method of claim 1, wherein the first, second, and third communication protocols are first, second, and third versions of an MQTT communication protocol.

8. A non-transitory computer readable medium comprising instructions that when executed by a computer processor cause the computer processor to be configure for:
instantiating an event stream processor comprising a communication adapter and a data store configured to store a subscription definition, a first communication model, and a second communication model, wherein the subscription definition specifies a first device as a publishing device, a second device as a subscriber of the first device, and a third device as a subscriber of the first device, wherein the first communication model specifies a first set of processes for converting messages received from the first device via a first communication protocol from a first format to a second format in order to transmit the messages to the second device via a second communication protocol, wherein the second communication model specifies a second set of processes for converting messages received from the first device via the first communication protocol from the first format to a third format in order to transmit the messages to the third device via a third communication protocol;
receiving, in the event stream processor through the communication adapter, a publication message from the first device via the first communication protocol, wherein the publication message comprises a unique identifier associated with the first device;
accessing the data store to identify the subscription definition based on the unique identifier associated with the first device;
based on the subscription definition and the first communication model, converting the publication message from the first format to the second format in order to transmit the publication message to the second device via the second communication protocol; and
based on the subscription definition and the second communication model, converting the publication message from the first format to the third format in order to transmit the publication message to the third device via the third communication protocol.

9. The non-transitory computer readable medium of claim 8, wherein the instructions further cause the computer processor to be configured for:
receiving, in the event stream processor through the communication adapter, a subscription request from the second device to subscribe to the first device, wherein the subscription request comprises the unique identifier associated with the first device and a unique identifier associated with the second device; and
generating, in the event stream processor, the subscription definition by associating the unique identifier associated with the second device with the unique identifier associated with the first device.

10. The non-transitory computer readable medium of claim 9, wherein the subscription request is a first subscription request, wherein the instructions further cause the computer processor to be configured for:
receiving, in the event stream processor through the communication adaptor, a second subscription request from the third device to subscribe to the first device, wherein the second subscription request comprises the unique identifier associated with the first device and a unique identifier associated with the third device; and
updating the subscription definition by associating the unique identifier associated with the third device with the unique identifier associated with the first device.

11. The non-transitory computer readable medium of claim 8, wherein the instructions further cause the computer processor to be configured for:
receiving, in the event stream processor through the communication adapter, a registration request from the first device, the registration request comprising the unique identifier associated with the first device and an indication of the first communication protocol; and
in response to the registration request, storing, in the data store, an association between the unique identifier associated with the first device and the indication of the first communication protocol.

12. The non-transitory computer readable medium of claim 8, wherein:
the publication message is received from the first device through a remote gateway configured to convert the first, second, and third communication protocols into a common communication protocol; and
the communication adapter is configured to process the publication message in the common communication protocol.

13. The non-transitory computer readable medium of claim 12, wherein the common communication protocol comprises a WebSocket communication protocol.

14. The non-transitory computer readable medium of claim 8, wherein the first, second, and third communication protocols are first, second, and third versions of an MQTT communication protocol.

15. A computer system comprising:
a processor; and
a memory comprising instructions that when executed by the processor cause the processor to be configured to:
instantiate an event stream processor comprising a communication adapter and a data store configured to store a subscription definition, a first communication model, and a second communication model, wherein the subscription definition specifies a first device as a publishing device, a second device as a subscriber of the first device, and a third device as a subscriber of the first device, wherein the first communication model specifies a first set of processes for converting messages received from the first device via a first communication protocol from a first format to a second format in order to transmit the messages to the second device via a second communication protocol, wherein the second communication model specifies a second set of processes for converting messages received from the first device via the first communication protocol from the first format to a third format in order to transmit the messages to the third device via a third communication protocol;
receive, in the event stream processor through the communication adapter, a publication message from the first device via the first communication protocol, wherein the publication message comprises a unique identifier associated with the first device;
access the data store to identify the subscription definition based on the unique identifier associated with the first device;
based on the subscription definition and the first communication model, convert the publication message from the first format to the second format in order to transmit the publication message to the second device via the second communication protocol; and
based on the subscription definition and the second communication model, convert the publication message from the first format to the third format in order to transmit the publication message to the third device via the third communication protocol.

16. The computer system of claim 15, wherein the instructions further cause the processor to be configured to:
receive, in the event stream processor through the communication adapter, a subscription request from the second device to subscribe to the first device, wherein the subscription request comprises the unique identifier associated with the first device and a unique identifier associated with the second device; and
generate, in the event stream processor, the subscription definition by associating the unique identifier associated with the second device with the unique identifier associated with the first device.

17. The computer system of claim 16, wherein the subscription request is a first subscription request, wherein the instructions further cause the processor to be configured to:
receive, in the event stream processor through the communication adaptor, a second subscription request from the third device to subscribe to the first device, wherein the second subscription request comprises the unique identifier associated with the first device and a unique identifier associated with the third device; and
update the subscription definition by associating the unique identifier associated with the third device with the unique identifier associated with the first device.

18. The computer system of claim 15, wherein the instructions further cause the processor to be configured to:
receive, in the event stream processor through the communication adapter, a registration request from the first device, the registration request comprising the unique identifier associated with the first device and an indication of the first communication protocol; and
in response to the registration request, store, in the event stream processor, an association between the unique identifier associated with the first device and the indication of the first communication protocol.

19. The computer system of claim 15, wherein:
the publication message is received from the first device through a remote gateway configured to convert the first, second, and third communication protocols into a common communication protocol; and
the communication adapter is configured to process the publication message in the common communication protocol.

20. The computer system of claim 19, wherein:
the common communication protocol comprises a Web-Socket communication protocol; and
the first, second, and third communication protocols are first, second, and third versions of an MQTT communication protocol.

* * * * *